INVENTOR
S.E. BRILLHART
BY
ATTORNEY

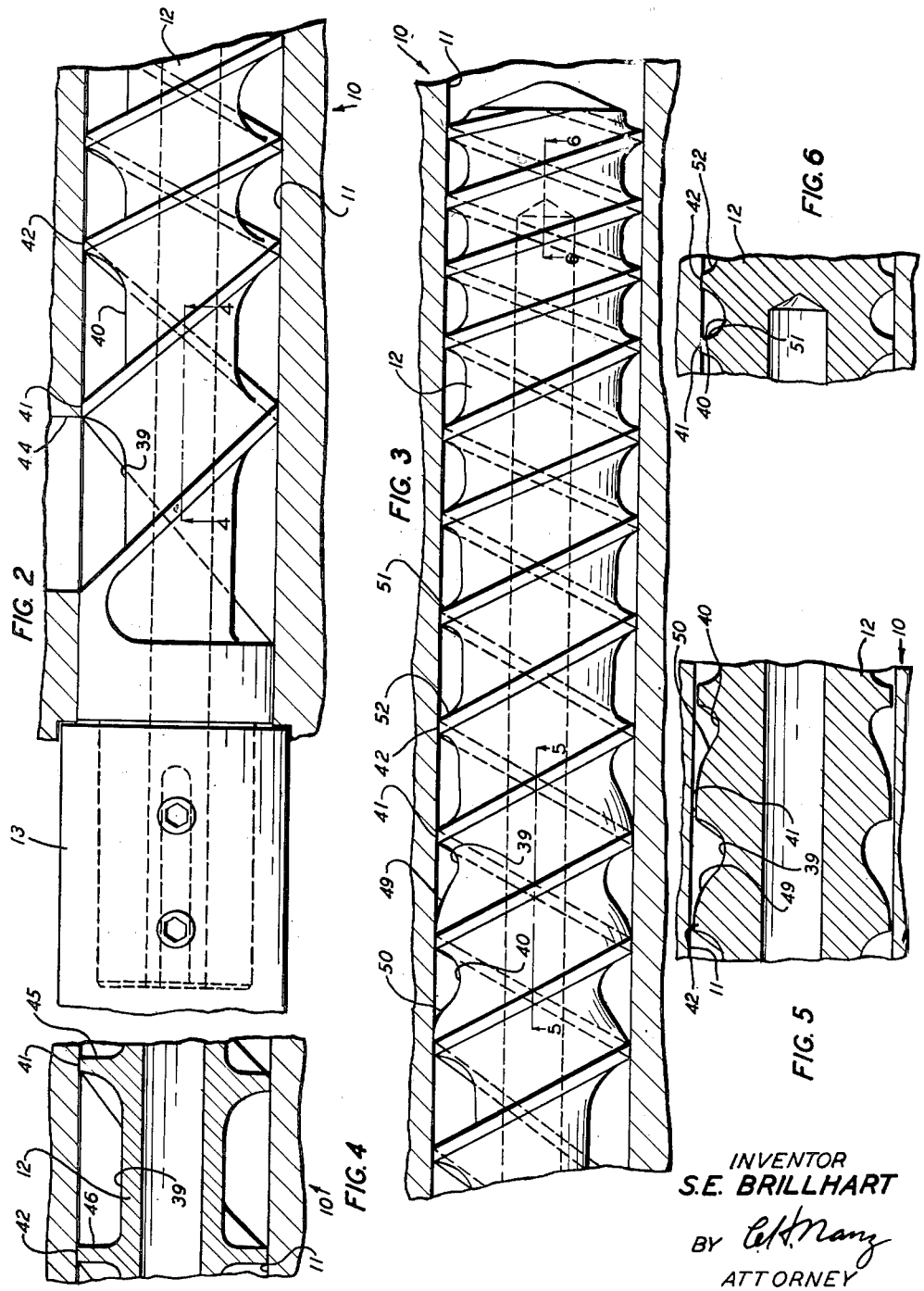

Patented Jan. 31, 1950

2,496,147

UNITED STATES PATENT OFFICE 2,496,147

APPARATUS FOR ADVANCING AND WORKING PLASTIC MATERIAL

Samuel E. Brillhart, Lutherville, Md., assignor to Western Electric Company, Incorporated, New York, N. Y., a corporation of New York Application November 13, 1946, Serial No. 709,536

6 Claims. (Cl. 18—13)

1

This invention relates to apparatus for advancing and working plastic material, and more particularly to extrusion screws for forcing plastic material through extrusion cylinders.

In the manufacture of extruded products, such as insulated conductors, plastic material, such as thermoplastic compounds or compounds including rubber or synthetic rubber-like materials, sometimes are milled to thoroughly mix and plasticize the material so that it may be extruded properly. The material then is inserted into an extruder, which extrudes the material upon a conductor, while the material is in a plastic condition. Such working operations are relatively expensive and require considerable handling of the material. In the past, there has been no apparatus for reducing or substantialy eliminating the necessity of the working operations prior to the insertion of the material into the extruder.

An object of the invention is to provide new and improved apparatus for advancing and working plastic material.

A further object of the invention is to provide new and improved extrusion screws for forcing the plastic material through extrusion cylinders and for plasticizing the material as it is forced through the extrusion cylinders.

An apparatus illustrative of the invention includes an extrusion screw provided with a thread. A portion of the thread has a flat face for advancing plastic material through a bore of an extrusion cylinder. Another portion of the thread is provided with a convex face for kneading the plastic material.

A complete understanding of the invention may be obtained from the following detailed description of an apparatus forming a specific embodiment thereof, when read in conjunction with the appended drawings, in which:

Fig. 2 is a reduced, fragmentary, longitudinal, vertical section of a portion of the apparatus;

Fig. 3 is a reduced, fragmentary, longitudinal, vertical section of another portion of the apparatus;

Fig. 4 is a section taken along line 4—4 of Fig. 2;

Fig. 5 is a section taken along line 5—5 of Fig. 3, and

Fig. 6 is a section taken along line 6—6 of Fig. 3.

Figure 1:
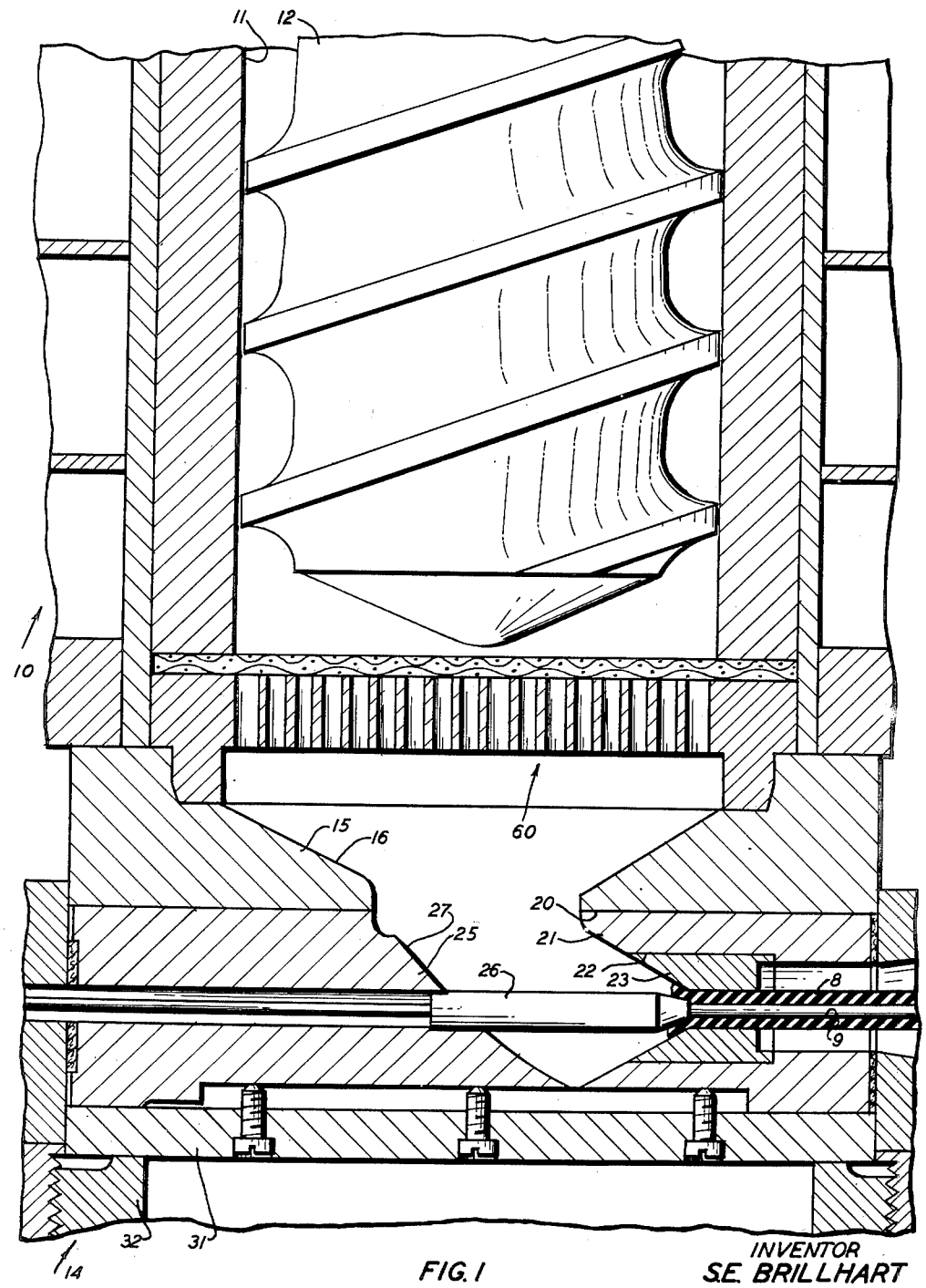
Fig. 1 is a fragmentary, transverse, horizontal section of an apparatus forming one embodiment of the invention.

Referring now in detail to the drawings, there is shown in Fig. 1 a portion of a continuous extrusion apparatus for forming a covering 8 of a plastic material around a filamentary conductor 9, which may be bare or may be covered with a textile or plastic covering. The plastic material may be a vulcanizable compound containing rubber or a synthetic rubber-like material, such as "neoprene," as its vulcanizable constituent, or it may be a thermoplastic material, such as a vinyl resin.

The extrusion apparatus includes an extrusion cylinder 10 having a bore 11 formed therein in which a stock screw 12 is rotatably mounted. The stock screw is rotated by a shaft 13 (Fig. 2) to force the plastic material under a high pressure to an extruding head 14 (Fig. 1). The extruding head includes a body member 15 having a tapered opening 16, which forms a continuation of the bore 11 and communicates with a bore 20 formed in the extruding head transversely of the tapered opening 16. An annular die holder 21 positioned in the exit end of the bore 20 has a counterbore 22 formed therein in which is mounted a forming die 23.

The conductor 9 is advanced horizontally toward the right, as viewed in Fig. 1, by suitable conductor-advancing means, such as a capstan (not shown) through a centrally-apertured core tube holder 25 and a core tube 26, which is secured in the exit end of the core tube holder 25. The core tube holder is provided with an inclined concave surface 27 for deflecting the plastic material toward the die 23. An aligning plate 31 maintains the die holder 21 and the core tube holder 25, and thereby the die 23 and the core tube 26, centered relative to each other in the bore 20, and a retaining nut 32 holds these elements in the extruding head 14.

The stock screw 12 includes roots 39 and 40 and threads 41 and 42 extending outwardly from the roots 39 and 40. The bore 11 has a uniform diameter along its entire length and encloses the stock screw 12 from the receiving end thereof, which is adjacent to an opening 44 formed in the wall of the extension cylinder 10, to the delivery end thereof (Fig. 1), which is adjacent to the extruding head 14. The diameters of the threads 41 and 42 are identical and are uniform throughout their entire lengths. The pitches of the threads 41 and 42 are identical with each other throughout the length of the screw 12 but decrease slightly from the receiving end of the screw to the delivery end thereof.

The roots 39 and 40 of the stock screw 12 also are identical with each other, but vary at different points along the screw. The roots 39 and 40 near the left end of the stock screw, as viewed in Figs. 2 and 3, are quite deep. Leading faces 45 and 46 of the portions of the threads 41 and 42, respectively, to the left of the central portion of the screw are substantially flat so that the delivery efficiency of these portions of the threads is high. At the central portion of the stock screw, the roots are more shallow, which reduces the cross-sectional areas of the grooves between the threads. Leading faces 49 and 50 of the central portions of the threads 41 and 42 are convex. In the portions of the threads to the right of the central portions of the threads, as viewed in Fig. 3, leading faces 51 and 52 of the threads are substantially flat to give this portion of the screw a high delivery efficiency.

In the operation of the apparatus described hereinabove, the stock screw 12 is rotated in the bore 11 by the shaft 13. The plastic material is fed continuously into the bore 11 through the opening 44 at a point adjacent to the left end of the extrusion screw, as viewed in Fig. 2, in sufficient volume to keep the bore 11 filled therewith. The extrusion screw forces the material along the bore 11 toward the right, as viewed in Fig. 2, and when the compound enters the central portions of the roots 39 and 40 of the screw, it is rolled up the convex faces 45 and 46 of the threads 41 and 42. Due to this rolling action, the convex faces 45 and 46 knead the material against the wall of the bore 11, and, since these convex faces are helical, they also tend to advance the material along the bore. The material is forced from the central portions of the roots 39 and 40 into the portions of the roots to the right, as viewed in Fig. 3. The portions to the right of the central portions of the roots are relatively shallow, and the material is rubbed between these portions of the root portions and the wall of the bore 11, which mills the material. The material then is forced through a strainer 60 and through the extruding head 14 while in a highly plastic condition from the working action of the stock screw 12.

The convex faces 45 and 46 roll the material up thereon and, with adjacent portions of the cylinder wall, which is stationary, while the screw 12 is rotated, work and break down the material. The milling action of the portions of the roots 39 and 40 to the right of the central portions thereof, as viewed in Fig. 3, and the portions of the wall of the bore 11 adjacent thereto, furthers the breakdown of the material. These working actions thoroughly heat, plasticize and mix the material while retaining relatively high delivery efficiencies.

The above-described apparatus serves to advance, heat, plasticize and mix the compound as the compound is being forced therethrough. Hence, premilling and preheating operations, which formerly were required to plasticize material before it could be introduced into a continuous extrusion apparatus, are substantially reduced or eliminated by the apparatus, thereby saving much labor and equipment.

What is claimed is:

1. An apparatus for advancing and working plastic material, which comprises a member mounted rotatably in a bore and having a continuous thread extending helically substantially from one end of the member to the other end thereof, a portion of said thread intermediate of the ends thereof having a delivery pitch and also having a convex leading face.

2. An extrusion screw, which comprises an elongated cylindrical member having at least one continuous thread extending helically substantially from one end of the member to the other end thereof, a portion of the thread having a convex leading face and also having a pitch such that it serves to advance material therealong, said portion of the thread also serving to knead plastic material advanced therethrough.

3. An extrusion screw, which comprises a cylindrical member mounted rotatably in a bore of an extrusion cylinder and having a continuous thread extending helically substantially from one end thereof to the other end thereof, said thread having a portion provided with a leading face which is sharply sloping in transverse cross-section of the thread from the tip thereof to the root of the member, said portion of the thread having a pitch designed to promote delivery efficiency of that portion of the thread.

4. An extrusion screw, which comprises a cylindrical member having a continuous thread extending helically substantially from one end thereof to the other end, said member having a receiving portion at one end thereof, the portion of the thread adjacent to the receiving portion thereof being wedge-shaped in transverse cross-section with the leading face of the thread making a sharp acute angle with the longitudinal axis of the member and sloping from the tip of the thread to the root of the member.

5. In an apparatus including an extrusion cylinder provided with a bore having a receiving portion and an exit portion and an extruding head mounted at the exit portion of the bore, a stock screw mounted rotatably in the bore and comprising a cylindrical member having at least one continuous thread extending helically from the receiving portion of the bore to the exit portion thereof, a portion of said thread intermediate the ends thereof being convex in transverse cross-section at the side facing the exit portion of the bore, whereby this portion of the thread exerts kneading and advancing actions upon plastic material being forced through the bore by the stock screw.

6. In an extruder including an extrusion cylinder provided with an elongated bore having a receiving portion and an exit portion and an extruding head mounted at the exit portion of the bore, an elongated stock screw mounted rotatably in the extrusion bore for forcing a plastic compound through the bore into the extruding head, said stock screw comprising an elongated cylindrical member, and a continuous thread extending helically along the periphery of the cylindrical member from the receiving portion of the bore to the exit portion thereof, a central kneading portion of the thread having a convex forward side, a delivery portion of the thread extending from the receiving portion of the bore to the kneading portion thereof and having a forward side substantially radial with respect to the axis of the cylindrical member, and a delivery portion of the thread extending from the central portion thereof to the exit portion of the bore and having a forward side substantially radial with respect to the axis of the cylindrical member.

SAMUEL E. BRILLHART.

REFERENCES CITED

The following references are of record in the file of this patent:

UNITED STATES PATENTS

| Number | Name | Date |
|---|---|---|
| 296,477 | Smith | Apr. 8, 1884 |
| 678,038 | Royle | July 9, 1901 |
| 793,895 | Monroe | July 4, 1905 |
| 1,297,482 | Little | Mar. 18, 1919 |
| 1,375,623 | Bartels | Apr. 19, 1921 |
| 1,516,968 | Johnson | Nov. 25, 1924 |
| 1,800,180 | Day | Apr. 7, 1931 |
| 1,902,295 | Shook | Mar. 21, 1933 |
| 1,964,600 | Royle | June 26, 1934 |